United States Patent [19]

Endo

[11] 4,122,449
[45] Oct. 24, 1978

[54] DEVICE FOR MEASURING A VEHICLE SPEED BY UTILIZING THE DOPPLER EFFECT

[75] Inventor: Akira Endo, Ibaraki, Japan

[73] Assignee: Hitachi, Ltd., Japan

[21] Appl. No.: 796,868

[22] Filed: May 16, 1977

[30] Foreign Application Priority Data

May 17, 1976 [JP] Japan .................................. 51-55403

[51] Int. Cl.² ........................... G01S 9/44; H01P 3/08; H04B 1/30
[52] U.S. Cl. ..................... 343/8; 333/84 M; 325/444
[58] Field of Search .................... 343/7 VM, 8, 5 PD; 325/444; 333/84 M

[56] References Cited

U.S. PATENT DOCUMENTS

| | | | |
|---|---|---|---|
| 3,611,374 | 10/1971 | Draysey | 343/8 |
| 3,805,262 | 4/1974 | Klein et al. | 343/8 |
| 3,909,746 | 9/1975 | Abraham et al. | 331/107 G |
| 3,955,194 | 5/1976 | Chua | 333/84 M |

*Primary Examiner*—Howard A. Birmiel
*Assistant Examiner*—Lawrence Goodwin
*Attorney, Agent, or Firm*—Craig & Antonelli

[57] ABSTRACT

A device for measuring vehicle speed by utilizing the Doppler effect includes a microwave oscillator element radiating microwaves to a wave guide, a mixer diode, and a strip line of approximately a Y-shape having two upper portions positioned within the wave guide for receiving the microwaves including both radiated and reflected waves. The two upper branch portions of the strip line are so arranged that both are spaced axially from each other by a distance of a quarter wave length of the microwave existing within the wave guide ($\lambda/4$), and induce electic power of equal level upon the receipt of the respective radiated and reflected waves. Futher, a first of the two upper branch portions of the strip line is shorter than the other by $\lambda/4$. At a connecting branch portion of the upper branch portions of the strip line, the radiated microwaves, which are received by the two upper branch portions, negate each other to a considerable extent, whereas the reflected microwaves, which are received by the two upper branch portions, positively add to each other. The radiated microwave and the reflected microwave are mixed together at a nearly equal rate and rectified by the mixer diode which is connected to the connecting branch portion of the strip line.

6 Claims, 3 Drawing Figures

DEVICE FOR MEASURING A VEHICLE SPEED BY UTILIZING THE DOPPLER EFFECT

The present invention relates to a speed measuring device for a vehicle which utilizes the Doppler effect of microwaves, and more particularly, to the structure of a receiver for receiving the microwaves within a wave guide.

Various anti-skid control apparatus have been developed for the safe driving of vehicles. In such anti-skid control apparatus, a speed meter using the Doppler effect is usually utilized because of size and the good sensitivity of measurement. Speed meters utilizing the Doppler effect are hereinafter called Doppler speed meters. A Doppler speed meter is provided for immediately detecting the actual speed of the vehicle upon applying the brake. In such Doppler speed meters, the speed of the vehicle is measured by comparing the frequency of radiated and reflected microwaves.

In a conventional Doppler speed meter, there are provided a solid-stage microwave active element, a wave guide one end of which is opened toward an object and the other end of which is closed, a strip line which connects the microwave active element and the wave guide, a directional coupler which is provided along the strip line and spaced therefrom in a very small distance, and a mixer diode rectifying the output from the directional coupler. The solid-state microwave active element, such as a Gunn diode, generates the microwave and radiates it into the wave guide. The microwave radiated into the wave guide is further radiated toward the object, such as ground, from the opening of the wave guide after travelling therethrough, and the reflected microwave is reflected back from the object and received by the strip line. A part of the microwave from the microwave active element and a major part of the reflected microwave are led to the mixer diode through the directional coupler. The transmitting efficiency of the directional coupler depends on the direction of the microwave in the strip line, i.e. the microwave from the microwave active element is transmitted at a relatively small rate and the reflected microwave at a relatively large rate. By operation of the directional coupler, the radiated microwave and the reflected microwave are adequately mixed together and applied as a signal indicating the speed of the vehicle.

The previously contemplated devices, however, have a drawback in construction and fabrication. That is, the directional coupler consists of a strip line which is formed extremely close and in parallel to the strip line connecting the microwave active element and the wave guide. The gap or spacing between the strip lines requires an accuracy of the order of a micron. Therefore, the directional coupler is produced by thin-film techniques known in the prior art. The gap is formed by etching after forming of the thin-film of metal on the ceramic plate by vacuum evaporation or spattering. Such thin-film techniques require a high accuracy for production equipment, and increase the cost of producing the device. Therefore, the speed measuring device of such construction is not suitable for mass production.

The present invention seeks to provide a speed measuring device which is suitable for mass production, yet is a highly sensitive and efficient device.

This object of the present invention is achieved in a speed measuring device which utilizes the Doppler effect and comprises a wave guide with an opening directed to an object, and an oscillating means radiating a microwave into the wave guide, wherein the radiated microwave is radiated to the object from the opening of the wave guide after travelling therethrough and is reflected by the object back into the wave guide. The device of the present invention further comprises a receiving means for receiving both the radiated microwave and reflected microwave, which provides an output component according to the difference in the frequencies of both microwaves, and a mixer diode for rectifying the output from the receiving means. The particular advantageous aspects of the present invention are characterized by the receiving means including two branch portions, one end of which is placed within the wave guide, and a connecting branch portion which is coupled to the other ends of said branch portions. The connecting branch portion is further connected to the mixer diode. This structure of the present invention is particularly advantageous if the distance between the one end of each of the branch portions is equal to $n\lambda + \lambda/4$ ($\lambda$ represents the wave length of the microwave within the wave guide, $n$ represents a positive integer including null or zero), and if the difference in the lengthof the branch portions is also equal to $n\lambda + \lambda/4$.

Accordingly, it is an object of the present invention to provide a device for measuring the speeds of vehicles using the Doppler effect which avoids by simple means the aforementioned shortcomings and drawbacks encountered in the previous constructions.

This and other objects, features and advantages of the present invention will become more apparent from the following description when taken in connection with the accompanying drawings which show, for purposes of illustration only, the Doppler speed meter in accordance with the present invention, and wherein.

Figure 1:
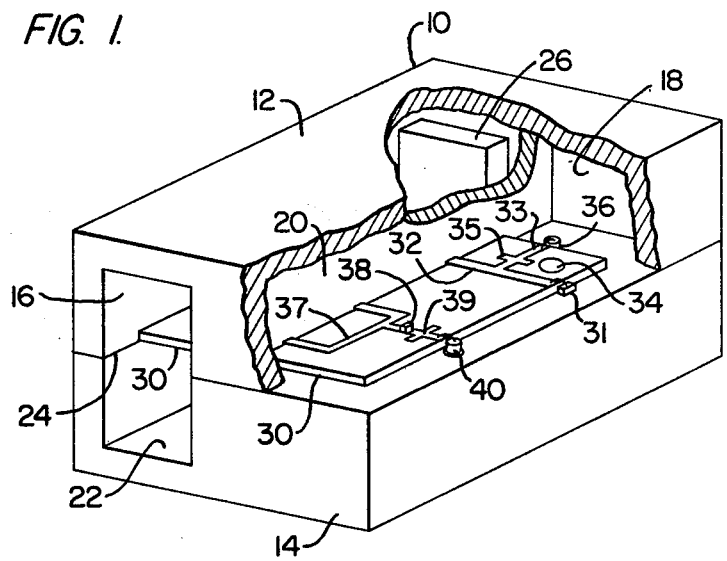
FIG. 1 is a perspective, cut-away view of an embodiment according to this invention in which the inner portions of the Doppler speed meter are partially shown.

Referring to FIG. 1, a container 10 for a Doppler speed meter according to the present invention comprises an upper housing member 12 and a lower housing member 14. The upper housing member 12 is provided with a groove or opening 16 of the rectangular section, and defines a chamber 18 which is separated from the groove 16 by a wall 20. The lower housing member 14 is also provided with a groove or opening 22 which mates with the groove 16. The upper member 12 is attached to the lower member 14 so that the groove 16 of the upper member 12 is aligned with the groove 22 of the lower member 14 to form a cavity 24 which functions as a wave guide, also indicated by the reference numeral 24. One end of the wave guide 24 is opened at one end of the container 10 and the other end of the wave guide 24 is terminated by a short plate 26.

A ceramic plate 30 is rigidly mounted between the members 12 and 14 so that it bridges both the groove 16 and the chamber 18 of the upper member 12. Microwave circuitry is arranged on the ceramic plate 30, and consists of two sections, i.e. an oscillating and a receiving section. The oscillating section includes a microwave oscillating element 31, strip lines 32 and 33, a circular resonator 34 and a low filter 35. The strip lines 32 and 33, the circular resonator 34 and the low pass filter 35 can be made of metal of high electric conductivity such as gold or silver. Silver is preferred because of its electric conductivity. In this embodiment, however, gold can be utilized because of its incorruptibility or resistance to change.

Figure 2A:
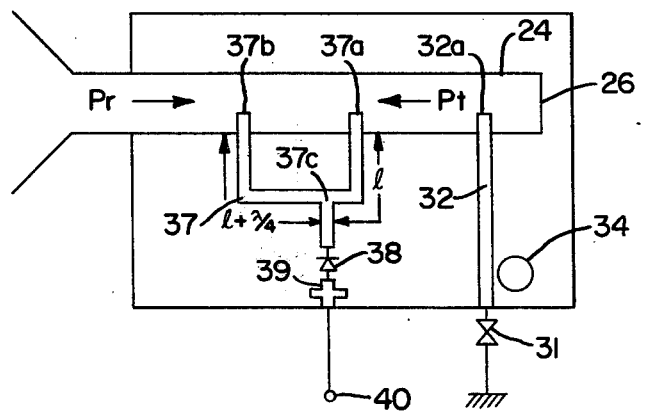
FIG. 2(a) is a schematic diagram of the microwave circuitry of the Doppler speed meter shown in FIG. 1.

In this embodiment, a bulk semiconductor device, such as a Gunn diode, can be used for the microwave oscillating element 31. An impact avalanche and transmit time diode (IMPATT diode) may be used in place of the bulk semiconductor device. The output terminal of the microwave oscillating element 31 is connected to one end of the strip line 32 which extends into the wave guide 24 through the wall 20. The strip line 32 has a branch strip line 33 extending laterally from an intermediate portion. Further, the low pass filter 35 is provided in the middle of the branch strip line 33. The branch strip line 33 is connected to a current source terminal 36 through which the microwave oscillating element 31 is supplied with electric power from a current source (not shown). The microwave oscillating element 31 generates the microwave and radiates it into the strip line 32, and the microwave is prevented from leaking through the branch strip line 33 by the function of the low pass filter 35. The frequency of the microwave is determined by the circular resonator 34, which consists of a circular metal plate, and performs the function of reactance and capacitance. In this embodiment, the frequency of the microwave is determined at 24 GHz. The other terminal of the microwave oscillating element 31 is connected to ground, as shown in FIG. 2(a).

The microwaves generated by the microwave oscillating element 31 radiate against the object, such as ground, through the wave guide 24. The object reflects the microwaves, and the reflected microwaves turn back and reach the wave guide 24 again. It is well known that a difference in frequency appears between the radiated and the reflected waves due to the Doppler effect, and that, when a wave source and the object approach to each other at a certain relative speed, the frequency of the reflected wave increases in proportion to the certain relative speed. Compared to the frequencies of the microwave generated by the oscillating element 31, however, the increment in the frequency of the reflected microwave is negligibly small, i.e. in order of a few KHz. Therefore, the microwaves within the wave guide 24 are nearly equal to that generated by the oscillating element 31 in frequency.

The receiving section on the ceramic plate 30 includes a strip line 37 of Y-shape, a mixer diode 38, a low pass filter 39 and an output terminal 40. Both upper ends of the two branch portions of the Y-shaped strip line 37 extend into the wave guide 24 through the wall 20. A connecting portion of the strip line 37 is connected to the other ends of the two branch portions and to the cathode terminal of the mixer diode 38. The anode terminal of the mixer diode 38 is connected to the output terminal 40 through the low pass filter 39. Electric power is received at the two upper ends of the branch portions of the strip line 37 of Y-shape according to the microwaves within the wave guide 34. The induced electric power is rectified and smoothed by the mixer diode 38 and the low pass filter 39.

Figure 2B:
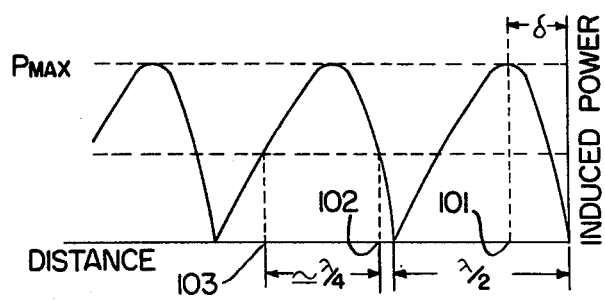
FIG. 2(b) shows a characteristic curve plotted of the electric power induced by a microwave with respect to its position within a wave guide.

Further detailed description of the microwave circuitry mentioned above will be given hereinafter with reference to FIGS. 2(a) and (b). In FIG. 2(a), the Dopper speed meter of FIG. 1 is shown in the form of a schematic diagram with omission of some of the elements thereof. Like reference numerals are used to indicate the same element as shown in FIG. 1. In FIG. 2(b), the curve indicates the induced electric power corresponding to the position along the wave guide 24, and the horizontal axis thereof indicates the distance from the surface of the short plate 26. As apparent from FIG. 2(b), the characteristic curve varies in its value between zero and the maximum value ($P_{MAX}$) every half wave length ($\lambda/2$) of the microwave within the wave guide 24, and the first point of the maximum electric power ($P_{MAX}$) appears at a distance of $\delta$ from the surface of the short plate 26.

The position of the end portion 32a of the strip line 32 within the wave guide 24 can be selected at the position where the maximum electric power ($P_{MAX}$) is induced, i.e. at a distance of $n\lambda/2+\delta$ from the surface of the short plate 26 (n represents a positive integer including null or zero). In this arrangement, the end portion 32a of the strip line 32 is located at the distance $\delta$ indicated by a reference numeral 101 in FIG. 2(b).

The location and the length of the strip line 37 of Y-shape having first and second end portions 37a and 37b and a connecting portion 37c are as follows. The end portions 37a and 37b are positioned within the wave guide 24 in such manner that the distance therebetween is equal to a quarter of the wave length ($\lambda/4$) of the microwave within the wave guide 24, and the electric powers induced at both positions are equal to each other. For example, such positions are indicated by reference numerals 102 and 103 in FIG. 2(b). Further, the length of the branch of the strip line 37 from the first end portion 37a to the connecting portion 37c (a first branch portion) differs from that of the branch from the second end portion 37b to the connecting portion 37c (a second branch portion). Assuming that the length of the first branch portion is represented by l, the length of the second branch portion is selected to be equal to l + $\lambda/4$. Thus, the latter is longer than the former by a quarter wave length ($\lambda/4$) of the microwave within the wave guide 24. The strip line 37 of the Y-shape and the low pass filter 39 are made of the same material as the oscillating section of the microwave circuitry.

This microwave circuitry does not require the accuracy of the order of a micron in its production, and can be constructed by a thick-film technique because there is no directional coupler which requires the very high production accuracy. The microwave circuitry of this arrangement is easily formed by heating the ceramic plate 30 after gold particles are printed thereon according to the necessary circuit pattern, and is entirely suitable for mass production.

The operation of the Doppler speed meter in accordance with the present invention will now be explained. The microwave generated by the microwave oscillating element 31 is led through the strip line 32 to the end portion 32a thereof, and radiated from the end portion 32a into the wave guide 24. After travelling through the wave guide 24 toward a object, such as the ground, indicated by arrow Pt in FIG. 2(a), the radiated microwave is reflected by the object back into the wave guide 24 as indicated by the arrow Pr.

The receiving section, that is, the first and the second end portions 37a and 37b of the strip line 37 of Y-shape, receives the radiated microwave as well as the reflected microwave. The radiated microwave is first received by the first end portion 37a and led to the connecting portion 37c through the first branch portion of the strip line 37. The radiated microwave is also received by the second end portion 37b which is located at a distance of λ/4 from the first end portion 37a. The microwave received by the second end portion 37b has a delay of $\pi/2$ in phase, which corresponds to the distance between the first and the second end portions 37a and 37b. This received microwave is led to the connecting portion 37c through the second branch portion of the strip line 37. Since the second branch portion is longer than the first branch portion by the length of λ/4, the microwave received by the second end portion 37b is further delayed by $\pi/2$ in phase. The two radiated microwaves transmitted to the connecting portion 37c negate each other to a considerable extent because of the delay of $\pi$ therebetween. Therefore, the radiated microwave led to the mixer diode becomes very small in level.

On the other hand, the reflected microwave is first received by the second end portion 37b and led to the connecting portion 37c through the second branch portion. The reflected microwave is also received by the first end portion 37a with the microwave, received by the first end portion 37a, having a delay $\pi/2$ in phase, which corresponds to the distance between the first and second end portions 37a and 37b. This microwave is transmitted to the connecting portion 37c through the first branch portion of the strip line 37. Since the second branch portion is longer than the first branch portion by λ4, the microwave received by the second end portion 37b is delayed by $\pi/2$ in phase. The two reflected microwaves become coincident with each other in phase and positively add to each other at the connecting portion 37c. Generally, when the distance between the end portions 37a and 37b is selected at a distance of $\lambda/4 + n\lambda$, the length of the first branch is so determined that it is shorter than the second branch by the length $\lambda/4 + n\lambda$ ($n$ represents a positive integer including zero) in order to obtain the same operation and function as above. This value of the length corresponds to $(2n + \frac{1}{2})\pi$ in phase of the microwave.

Because the radiated microwave is greater than the reflected microwave within the wave guide, these microwaves at the connecting portion 37c become nearly equal to each other in level. After these two microwaves are rectified and smoothed by the mixer diode 38 and the low pass filter 39, the smoothed current is applied as an output signal indicating the speed of the vehicle. Thus, the value of the output signal depends on the frequency difference between the radiated microwave and the reflected microwave, since the change in frequency by the relative movement between the microwave source and the object represents the difference between the induced signals between the radiated and reflected microwaves.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

I claim:

1. A device for measuring a speed of a vehicle by utilizing the Doppler effect comprising:
   a wave guide with an opening which is directed to an object,
   oscillating means for radiating a microwave into the wave guide such that the radiated microwave is radiated to the object from the opening of the wave guide after travelling therethrough and is reflected by the object back into said wave guide; and
   receiving means for receiving both the radiated microwave and the reflected microwave and generating therefrom an output component in accordance with the difference in frequencies of both of the microwaves, said receiving means including two branches, each branch having a first and second end portions, said receiver means further including a mixer diode and a connecting portion for connecting said second end portions of said branches to said mixer diode, wherein said first end portions are located within said wave guide so that the power induced in both first end portions is equal and such that the distance in said wave guide therebetween is equal to $n\lambda + \lambda/4$, where λ represents the wave length of the microwave within the wave guide and $n$ is a positive integer including zero, and wherein the length of the branch with its first end portion positioned in said wave guide closest to said wave guide opening is greater than the other branch by $m\lambda + \lambda/4$, where $m$ is a positive integer including zero.

2. A device as claimed in claim 1, characterized in that said oscillating means comprises a microwave oscillator and a strip line one end of which is connected to said oscillator and the other end of which is located within said wave guide at a point therein where the other end of said strip line can induce the maximum electric power.

3. A device as claimed in claim 2, characterized in that said strip line connected to said oscillating means has an arm portion connected to a current source terminal.

4. A device as claimed in claim 3, characterized by a first low pass filter which is provided in said arm portion of said strip line connected to said oscillating means.

5. A device as claimed in claim 1, characterized by a second low pass filter connected to an output terminal of said mixer diode, for smoothing and filtering the rectified output therefrom.

6. A device for measuring a speed of a vehicle by utilizing the Doppler effect comprising:
   a wave guide with an opening which is directed to an object,
   an oscillating means for radiating a microwave into the wave guide such that the radiated microwave is radiated to the object from the opening of the wave guide after travelling therethrough and is reflected by the object back into said wave guide; and
   a receiving means for receiving both the radiated microwave and the reflected microwave and generating therefrom an output component in accordance with the difference in frequencies of both of the microwaves, said receiving means including two branches each having a first end portion located within said wave guide such that there is a predetermined distance therebetween, and connecting means for combining the signals obtained from said two first end portions such that the microwave signals from said oscillating means propagating in said wave guide are added out of phase to obtain a substantially reduced radiated signal at the output of said connecting means and such that signals reflected from said object propagating in said wave guide are added in phase to substantially increase the reflected signal level at the output of said connecting means so that the radiated and reflected signals are of approximately the same level, and said receiving means further including means for generating an output signal in accordance with the difference in frequencies between said radiated and reflected microwaves.

* * * * *